(12) United States Patent
Stanners

(10) Patent No.: US 6,583,864 B1
(45) Date of Patent: Jun. 24, 2003

(54) SELF SERVICE TERMINAL

(75) Inventor: Anthony J. Stanners, Tokyo (JP)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/538,977

(22) Filed: Mar. 31, 2000

(30) Foreign Application Priority Data

Apr. 1, 1999 (GB) .............................................. 9907515

(51) Int. Cl.⁷ ................................................. A61B 3/14
(52) U.S. Cl. ............................ 356/71; 348/78; 351/206
(58) Field of Search .......................... 356/71; 351/206; 348/78

(56) References Cited

U.S. PATENT DOCUMENTS

| 4,641,349 A | | 2/1987 | Flom et al. | |
|---|---|---|---|---|
| 5,412,442 A | * | 5/1995 | Katsuragi et al. | 351/206 |
| 5,751,836 A | | 5/1998 | Wiles et al. | |
| 5,956,122 A | | 9/1999 | Doster | |
| 6,082,859 A | * | 7/2000 | Okashita et al. | 351/206 |
| 6,247,813 B1 | * | 6/2001 | Kim et al. | 351/206 |

FOREIGN PATENT DOCUMENTS

| WO | 9001291 | 2/1990 |
|---|---|---|
| WO | 9721188 | 6/1997 |
| WO | 9746978 | 12/1997 |
| WO | 9808439 | 3/1998 |
| WO | 9906928 | 2/1999 |

* cited by examiner

*Primary Examiner*—Richard A. Rosenberger
(74) *Attorney, Agent, or Firm*—George H. Gates

(57) ABSTRACT

A self service terminal (10) including a human iris identification system is described. The iris identification system comprises a camera (30) for recording an image of a human iris via a lens (32), a processor (54) for processing the recorded image, and a plurality of visual indicators (72,74, 76 or 82,84,86) associated with the lens (32) for directing a user's eye towards the lens (32) of the camera (30), thereby enabling the camera (30) to record a clear image of the user's eye. A method of directing a user's eye towards a lens (32) of a camera (30) used in a human iris identification system is also described.

35 Claims, 3 Drawing Sheets

SELF SERVICE TERMINAL

BACKGROUND OF THE INVENTION

The present invention relates to a self service terminal (SST). In particular the invention relates to an SST including a human iris identification system.

Iris identification systems are used in SSTs such as ATMs (automated teller machines) for identifying a user of the terminal without the user having to, provide an identification card.

In such a system, a user must first be enrolled. Enrolment involves obtaining an image of the iris of a user and processing this image to produce an iris signature (or code). The iris code is stored in a database of authorized users.

When an authorized user wishes to use an ATM implementing iris identification, the user looks at a camera associated with the ATM, and the camera records an image of the user's iris. This recorded image is processed to produce an iris code. The user's iris code is compared with the database of stored iris codes to find the closest match. If the closest match meets a predetermined acceptance criterion (for example, greater than a 99.999% probability of being correct) then the closest match is assumed to be the user, and the user is identified accordingly.

This system works effectively if users keep their eyes motionless and wide open so that a clear image of their iris can be obtained and recorded. Where users can be trained to use iris identification (for example where iris identification ATMs are located on military bases or on naval ships and are used by military personnel) there is generally very little problem in identifying a user. However, when iris identification ATMs are used by the general public, the ATMs may have difficulty in identifying a user because of the user's continuous head and/or eye movement.

SUMMARY OF THE INVENTION

It is an object of an embodiment of the present invention to obviate or mitigate the above problem.

According to one aspect of the invention there is provided a self service terminal including a human iris identification system, the system comprising a camera for recording an image of a human iris via a lens, and a processor for processing the recorded image, characterized by a plurality of visual indicators associated with the lens for directing a user's eye towards the lens of the camera.

It should be appreciated that the visual indicators are associated with the lens by being in general alignment with an optical axis which passes through the user's eye and the lens; for example, the visual indicators may be in registration with the axis which passes through the user's eye and the lens. It should also be appreciated that the term lens is used herein in a broad sense, to include different types of light gathering optics. A lens may include more than one optical element. The light gathering optics may deflect received light into the camera; for example, a mirror arrangement may be used to deflect and convey light to the camera.

Each visual indicator may comprise a single indicator element at least partially surrounding the center of the lens; alternatively, each indicator may comprise two or more indicator elements, each element being generally equidistant from the center of the lens.

Preferably, each visual indicator is spaced from the center of the lens by a different amount. Preferably, each visual indicator defines an axis which is co-axial with an axis through the center of the lens.

Preferably, each visual indicator is selectively energizable, so that, in use, the indicators may be successively energized, starting with the indicator furthest from the center of the lens and finishing with the indicator closest to the center of the lens, thereby guiding a user's eye to the center of the lens.

Where each visual indicator uses a single element, the element may be generally circular, and each visual indicator may have a different diameter so that the indicators are generally concentric about the center of the lens.

The effect of the visual indicators is to provide a series of sequentially illuminated lights for guiding a user's eye towards the lens of the camera.

Preferably, the visual indicators are removed (de-energized) when the user has been identified.

In one embodiment, the color of the visual indicators may change once identification has been established, for example from red light to green light.

The visual indicators may be permanently illuminated or they may pulsed so that they flash. As identification nears completion, the frequency of the flashing may be changed by the iris identification system. For example, the frequency of the flashing may be increased as the identification system progresses towards identifying the user.

An advantage of the invention is that as the visual indicators appear to advance towards the center of the lens, the user's eyes are guided to the center of the lens thereby aligning the user's iris with the camera. No previous training is required to enable a user to use this system.

According to a second aspect of the invention there is provided a human iris identification system, the system comprising a camera for recording an image of a human iris via a lens, and a processor for processing the recorded image, characterized by a plurality of visual indicators associated with the lens for directing a user's eye towards the lens of the camera.

According to a third aspect of the invention there is provided a method of directing a user's eye towards a lens of a camera used in a human iris identification system, the method characterized by the steps of: providing a plurality of visual indicators, each visual indicator being spaced from the center of the lens by a different amount, and successively energizing individual indicators starting with the indicator furthest away from the center of the lens so that a user's eye is directed towards the lens.

BRIEF DESCRIPTION OF THE DRAWINGS

These and other aspects of the invention will become apparent from the following specific description, given by way of example, with reference to the accompanying drawings, in which.

DETAILED DESCRIPTION

Figure 1:
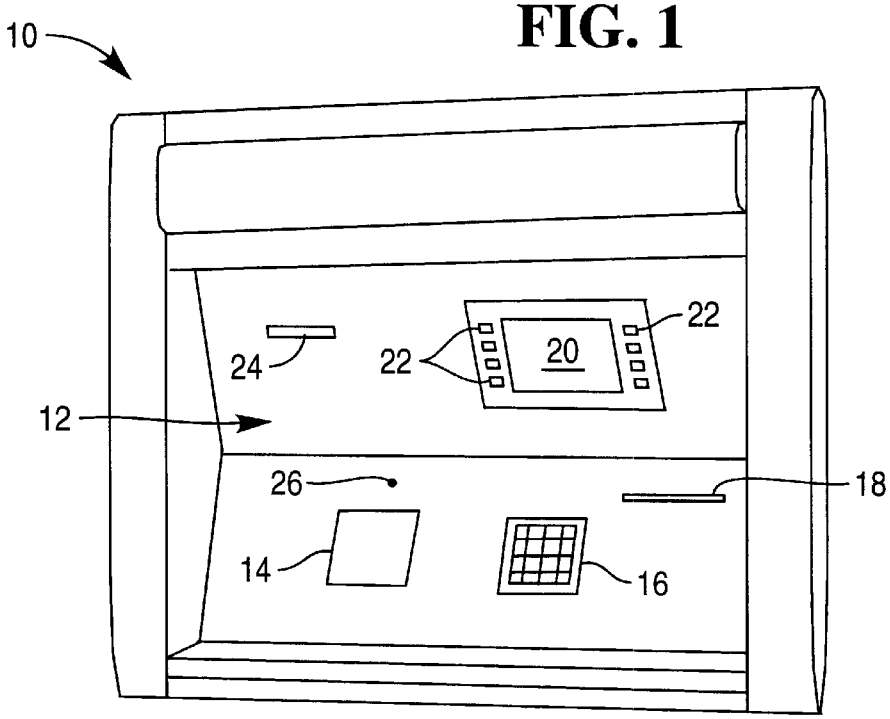
FIG. 1 is a schematic diagram of an SST incorporating an iris identification unit in accordance with an embodiment of the invention.

Referring to FIG. 1, which shows an SST 10 in the form of an ATM, the ATM 10 includes a user interface 12 which comprises: a visual indicator display 14 in the form of an LCD panel, a key pad 16 for entering transaction details, a cash dispenser slot 18 through which bank notes (valuable media) are dispensed to a user, a display screen 20 for providing transaction information to the user, additional keys (FDKs) 22 disposed at opposite sides of the screen 20 for enabling the user to select preset functions which are displayed on the screen 20 and aligned with the FDKs 22, a receipt printer slot 24 through which a receipt for a transaction may be delivered to the user, and a sensor 26 for detecting when a user is present at the ATM 10.

Figure 2:
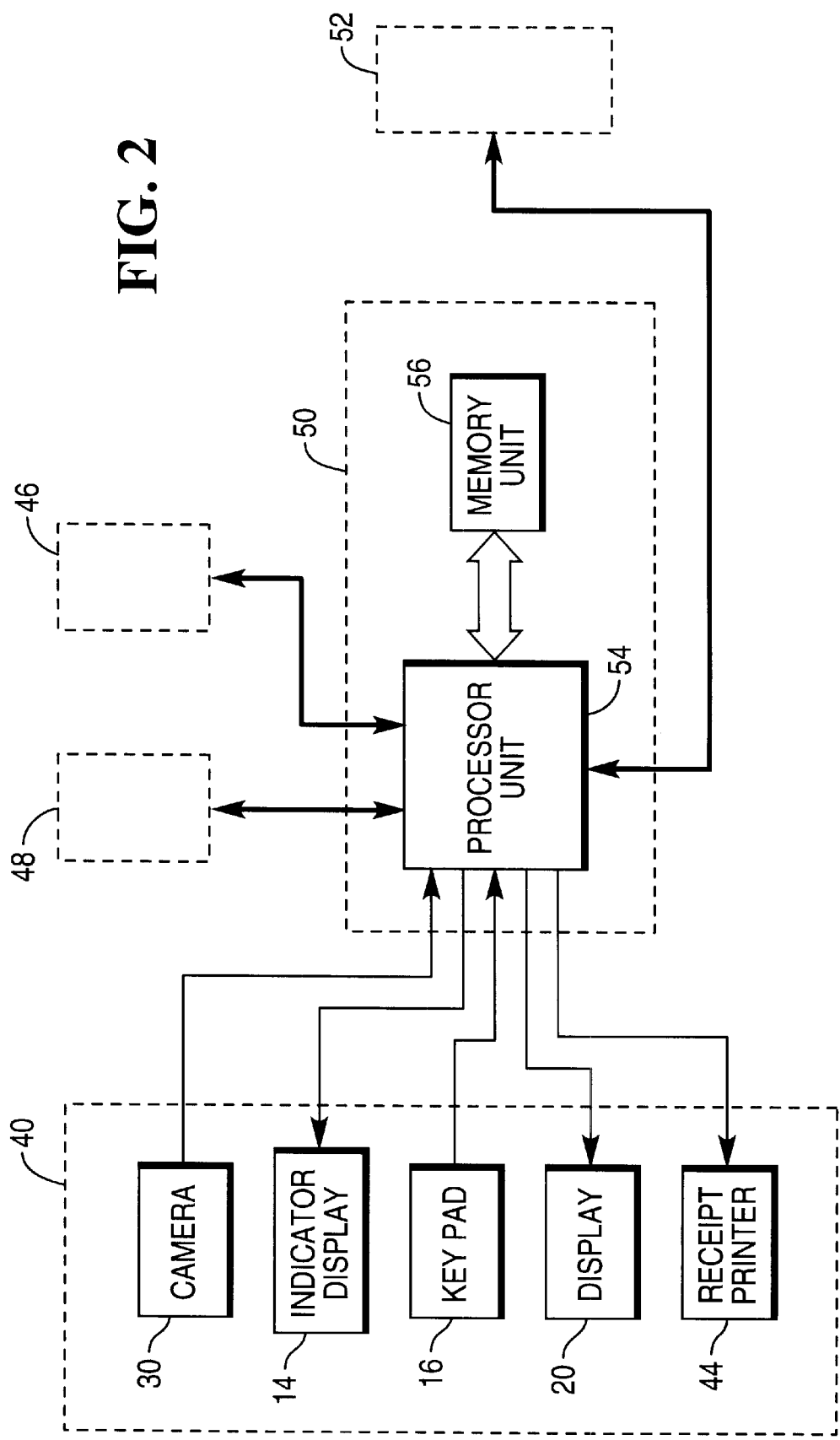
FIG. 2 is a block diagram of the SST of FIG. 1.

FIG. 2 shows a block diagram of the ATM of FIG. 1. FIG. 2 shows a user interface module block 40 including a camera 30, the visual indicator display 14, the key pad 16, the transaction display 20, and a receipt printer module 44. The receipt printer module 44 is associated with slot 24 in the user interface 12 of the ATM 10. FIG. 2 also shows a cash dispenser module 46 which is associated with the cash dispenser slot 18, and a biometrics sensing processor unit 48 which operates in association with the camera 30 to implement biometrics sensing of the user.

The ATM 10 further comprises processor means in the form of a controller unit 50 which communicates with components of the user interface module block 40, with an operator panel 52 mounted inside the ATM 10, with the cash dispenser module 46, and with the biometrics sensing processor unit 48.

The operator panel 52 contains circuitry for enabling the operator to interact with the ATM 10. Standard operator panels 52 are used on commercially available ATMs and are well known in the art. Similarly, the cash dispenser module 46 will not be described as it is a standard feature of a conventional ATM.

The controller unit 50 includes a processor unit 54 and a non-volatile memory 56. The processor unit 54 and memory 56 may be implemented by a microcomputer having non-volatile RAM; suitable computers and memories are readily available commercially.

Figure 3:
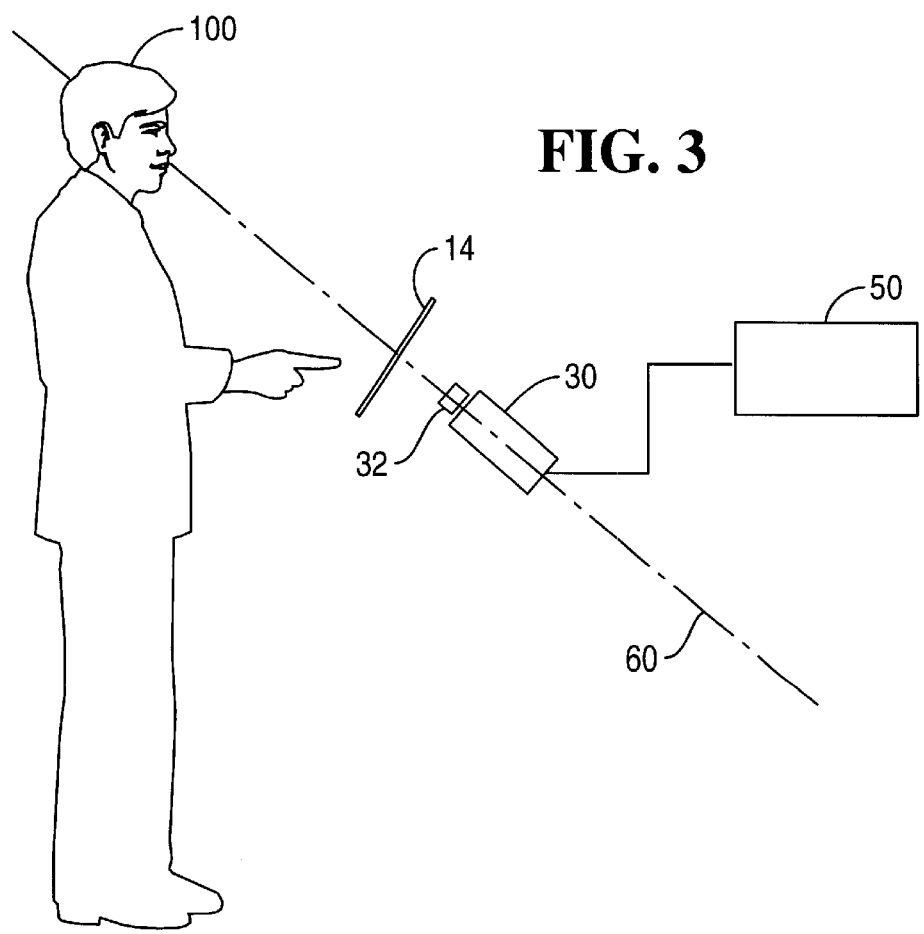
FIG. 3 is a simplified schematic view of a typical arrangement and orientation of details of FIGS. 1 and 2.

FIG. 3 is a simplified schematic view of a typical arrangement of the camera 30, the LCD panel 14, and a user 100. The camera 30 has a lens 32 and is coupled to the controller unit 50. The camera 30 and lens 32 are oriented along an optical axis (shown by line 60) which passes through the center area of LCD panel 14. The angle of axis 60 is selected so that it passes through the eye-level of an average height user 100. The camera 30 and lens 32 have some degree of adjustability to enable images to be recorded from users of different heights. Suitable systems comprising camera 30, lens 32, and biometrics unit 48 are available from "SENSAR" of 121 Whittendale Drive, Moorestown, N.J., USA 08057.

Figure 4:
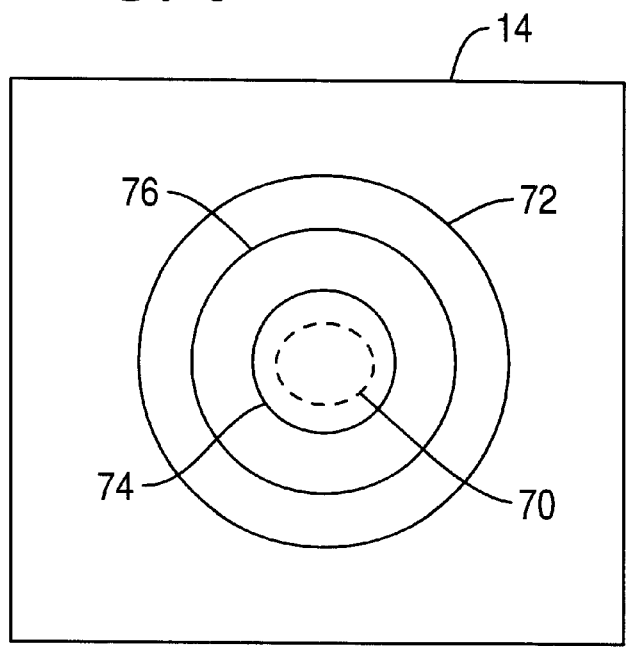
FIG. 4 is a schematic view of visual indicators displayed on a panel used in FIG. 1.

In use, when user 100 approaches ATM 10 the sensor 26 senses that a user 100 is present. This causes the display screen 20 to display text instructing the user 100 to look at LCD panel 14. Sensor 26 also causes LCD 14 to display visual indicators as shown in FIG. 4.

LCD panel 14 has a transparent center area 70 through which the camera 30 and lens 32 view the user 100; that is, the center area 70 is the entry point for light from a user's eye. In registration with the center area 70 are three concentric visual indicators, each having a single element. Each indicator has a center located in the center area 70, and has a different diameter to the other indicators.

Indicator 72 has the largest diameter and is colored red. Indicator 74 has the smallest diameter and is colored green. Indicator 76 has a diameter approximately mid-way between that of indicators 72 and 74, and is colored amber.

Initially, the red indicator 72 is illuminated, shortly thereafter the amber indicator 76 is also illuminated, shortly thereafter the green 74 is also illuminated. This has the effect of guiding the user's eyes to the center area 70 (through which axis 60 passes), thereby aiding capture of a clear image of the user's eye. The image is conveyed via controller unit 50 to the biometrics sensing unit 48 and an iris code is generated.

The controller unit 50 accesses a remote database (not shown) which compares the user's iris code with stored iris codes to identify the user 100. Various algorithms are available for processing an image of an iris to create an iris code.

Once the user 100 has been identified, the three visual indicators 72,74,76 are de-energized, so that the user's attention may be drawn to screen 20, where the user 100 is presented with a menu of the various transactions available at the ATM 10.

Figure 5:
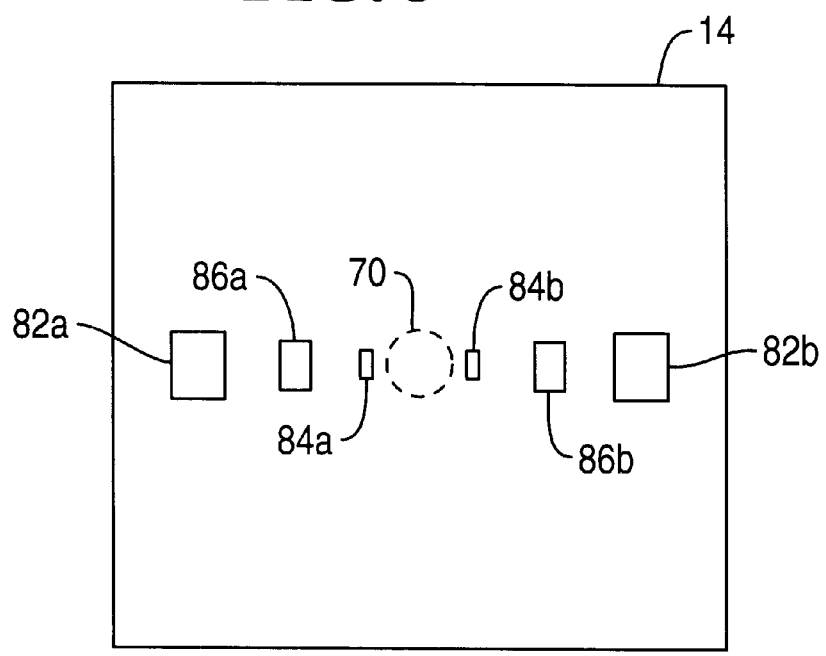
FIG. 5 is a schematic view of alternative visual indicators displayed on a panel used in FIG. 1.

FIG. 5 shows alternative visual indicators in the form of pairs of elements. Each pair of elements (for example, elements 82a,b) form a visual indicator which is centered on area 70. When these indicators are used, the energizing sequence is the same as for FIG. 4, but the indicator which is furthest from the center 70 is de-energized when a closer indicator is energized. Thus, indicator 82 (elements 82a and 82b) is energized first, then indicator 82 is de-energized and indicator 86 is energized, then indicator 86 is de-energized and indicator 84 is energized.

Various modifications may be made to the above described embodiments within the scope of the present invention, for example, the shape, color, and configuration of the visual indicators may be changed. The time delay between energizing indicators may be varied or it may depend on what stage of identification the biometrics unit has reached. Visual indicators having more than two elements per indicator may be used. The camera may be located in any convenient location, for example, on the top surface of the ATM. The LCD 14 may be incorporated into a covering for the camera 30 and lens 32; so that the camera 30, lens 32, and LCD 14 form a single unit. The function of the sensor 26 may be implemented by the camera 30. It will be appreciated that a simplified camera and lens arrangement have been illustrated, in other embodiments, much more complex optical arrangements may be used; for example, the lens may be a combination of optical elements such as mirrors and/or standard lens arrangements. If the lens deflects received light, then the optical axis will not be straight. In such an embodiment, the visual indicators associated with the lens, will be associated with the part of the lens adjacent to the entry point of light from a user's eye, that is, the point at which a user looks to have an image of his/her iris recorded. In other embodiments, the iris identification system may be used in conjunction with a user entering an identification token, such as a card, so that the iris identification system verifies the identity of the user.

What is claimed is:

1. A self-service terminal comprising:
    a camera including a lens for recording an image of a human iris;
    a process for processing the recording image; and
    a visual indicator display providing a plurality of selectively energizable visual indicators successively energized and associated with the lens for directing a user's eye towards a center of the lens of the camera.

2. A self-service terminal according to claim 1, wherein each visual indicator comprises a single indicator element at least partially surrounding the center of the lens.

3. A self-service terminal according to claim 2, wherein each element is substantially circular, and each visual indicator has a different diameter so that the indicators are substantially concentric about the center of the lens.

4. A self-service terminal according to claim 1, wherein each indicator comprises two or more indicator elements, and each element is substantially equidistant from the center of the lens.

5. A self-service terminal according to claim 1, wherein the plurality of visual indicators are successively energized, starting with a furthest indicator from the center of the lens and finishing with a closest indicator to the center of the lens.

6. A self-service terminal according to claim 1, wherein the visual indicators are pulsed so that they flash.

7. A self-service terminal according to claim 1, wherein the color of the visual indicators changes once the user has been identified.

8. A self-service terminal according to claim 1, wherein the visual indicators are de-energized once the user has been identified.

9. A human iris identification system comprising:
   a camera including a lens for recording an image of a human iris;
   a processor for processing for recorded image;
   a visual indicator display providing a plurality of selectively energizable visual indicators successively energized and associated with the lens for directing a user's eye towards a center of the lens of the camera.

10. A human iris identification system according to claim 9, wherein each visual indicator comprises a single indicator element at least partially surrounding the center of the lens.

11. A human iris identification system according to claim 10, wherein each element is substantially circular, and each visual indicator has a different diameter so that the indicators are substantially concentric about the center of the lens.

12. A human iris identification system according to claim 9, wherein each indicator comprises two or more indicator elements, and each element is substantially equidistant from the center of the lens.

13. A human iris identification system according to claim 9, wherein the plurality of visual indicators are successively energized, starting with a furthest indicator from the center of the lens and finishing with a closest indicator to the center or the lens.

14. A human iris identification system according to claim 9, wherein the visual indicators are pulsed so that they flash.

15. A human iris identification system according to claim 9, wherein the color of the visual indicators changes once the user has been identified.

16. A human iris identification system according to claim 9, wherein the visual indicators are de-energized once the user has been identified.

17. A method of directing a user's eye towards a lens of a camera used in a human iris identification system, the method comprising the steps of:
   providing a plurality of visual indicators, each visual indicator being spaced from the center of the lens by a different amount; and
   successively energizing individual indicators starting with the indicator furthest away from the center of the lens so that a user's eye is directed towards the lens.

18. A method of operating a self-service terminal having a lens of a camera of a human iris identification system, the method comprising the steps of:
   providing a plurality of visual indicators, each visual indicator being spaced from the center of the lens by a different amount; and
   successively energizing individual indicators starting with the indicator furthest away from the center of the lens so that an eye of a self-service terminal user is directed towards the lens.

19. A method of operating an automated teller machine (ATM) having a lens of a camera of a human iris identification system, the method comprising the steps of:
   providing a plurality of visual indicators, each visual indicator being spaced from the center of the lens by a different amount; and
   successively energizing individual indicators starting with the indicator furthest away from the center of the lens so that an eye of an ATM customer is directed towards the lens.

20. A method of directing a user's eye towards a lens of a camera used in a human iris identification system, the method comprising the steps of:
   providing a plurality of visual indicators, each visual indicator being spaced from a center of the lens by a different amount; and
   successively energizing the plurality of visual indicators so that a user's eye is directed towards the center of the lens.

21. The method of claim 20, wherein each visual indicator comprises a single indicator element at least partially surrounding the center of the lens.

22. The method of claim 21, wherein each element is substantially circular, and each visual indicator has a different diameter so that the indicators are substantially concentric about the center of the lens.

23. The method of claim 20, wherein each indicator comprises two or more indicator elements, and each element is substantially equidistant from the center of the lens.

24. The method of claim 20, wherein the plurality of visual indicators are successively energized, starting with a furthest indicator from the center of the lens and finishing with a closest indicator to the center of the lens.

25. The method of claim 20, wherein the visual indicators are pulsed so that they flash.

26. The method of claim 20, wherein the color of the visual indicators changes once the user has been identified.

27. The method of claim 20, wherein the visual indicators are de-energized once the user has been identified.

28. A method of operating a self-service terminal having a lens of a camera of a human iris identification system, the method comprising the steps of:
   providing a plurality of visual indicators, each visual indicator being spaced from a center of the lens by a different amount; and
   successively energizing the plurality of visual indicators so that an eye of a self-service terminal user is directed towards the center of the lens.

29. The method of claim 28, wherein each visual indicator comprises a single indicator element at least partially surrounding the center of the lens.

30. The method of claim 29, wherein each element is substantially circular, and each visual indicator has a different diameter so that the indicators are substantially concentric about the center of the lens.

31. The method of claim 28, wherein each indicator comprises two or more indicator elements, and each element is substantially equidistant from the center of the lens.

32. The method of claim 28, wherein the plurality of visual indicators are successively energized, starting with a furthest indicator from the center of the lens and finishing with a closest indicator to the center of the lens.

33. The method of claim 28, wherein the visual indicators are pulsed so that they flash.

34. The method of claim 28, wherein the color of the visual indicators changes once the user has been identified.

35. The method of claim 28, wherein the visual indicators are de-energized once the user has been identified.

* * * * *

UNITED STATES PATENT AND TRADEMARK OFFICE
CERTIFICATE OF CORRECTION

PATENT NO. : 6,583,864 B1  Page 1 of 1
DATED : June 24, 2003
INVENTOR(S) : Stanners, A.

It is certified that error appears in the above-identified patent and that said Letters Patent is hereby corrected as shown below:

<u>Column 4,</u>
Line 60, after "a" delete "process" and insert -- processor --.

Signed and Sealed this

Sixteenth Day of September, 2003

JAMES E. ROGAN
*Director of the United States Patent and Trademark Office*